June 7, 1960 C. B. SHELMAN 2,940,067

MAGNETIC CORE CIRCUIT

Filed Aug. 1, 1956 3 Sheets-Sheet 1

INVENTOR.
CECIL B. SHELMAN

BY Walter J. Jason

ATTORNEY

June 7, 1960 C. B. SHELMAN 2,940,067

MAGNETIC CORE CIRCUIT

Filed Aug. 1, 1956 3 Sheets-Sheet 2

INVENTOR.
CECIL B. SHELMAN

BY Walter J. Jason
ATTORNEY

June 7, 1960 C. B. SHELMAN 2,940,067

MAGNETIC CORE CIRCUIT

Filed Aug. 1, 1956 3 Sheets-Sheet 3

INVENTOR.
CECIL B. SHELMAN

BY Walter J. Jason

ATTORNEY

United States Patent Office 2,940,067
Patented June 7, 1960

2,940,067

MAGNETIC CORE CIRCUIT

Cecil B. Shelman, Fort Worth, Tex., assignor to General Dynamics Corporation (Convair Division), San Diego, Calif., a corporation of Delaware Filed Aug. 1, 1956, Ser. No. 601,594
11 Claims. (Cl. 340—174)

The present invention relates generally to digital computing circuitry. More particularly the invention relates to pulsed magnetic core circuits employed to perform logical operations in digital computers, data processing systems and other related apparatus.

Inasmuch as the logic employed in such systems is of the binary type, components having two stable states are highly desirable. Although vacuum tubes, transistors and diodes operate in bistable circuits, such devices are not inherently bistable elements. Magnetic cores with rectangular hysteresis loops having two stable magnetic flux states are ideal for this type of operation because the states, and thus the information, may be retained in the core indefinitely without the necessity for standby power. However, when it becomes necessary to determine the state of a core it must be interrogated by current pulses through windings on the core. This, then, is a fundamental difference between magnetic core circuits and other logical circuits, where the states are represented by voltage levels. This difference does not invalidate the logical design employed in present systems but it does require a new approach in component design. Magnetic core circuits can be made to perform "and," "or," "not" and a variety of other logical functions; however, as such operations become more complex, the number of windings on a core must increase. When a core changes magnetic state, a voltage will be induced in all windings on the core and current will flow if there exists a closed circuit, including any winding on the core. Current flow through some of the windings is necessary to perform the logical operation; however, any other current flow is deleterious and unnecessary to the operation. Two general solutions to this problem of current flow control are apparent, one being to channel the current only into circuits where the logical information is not destroyed but may be stored and used. This involves the obvious disadvantage of requiring energy unnecessarily. The other is to prevent such superfluous current from flowing in the first place. This latter circuit implementing the second approach is predicated upon the precept of following a high impedance path where current flow is undersirable and a low impedance path where current is desirable.

Due to the fact that the circuit forms the basis for a large number of logical circuits, several of these logical circuits will be presented to indicate the scope to which this basic circuit may be applied.

One such circuit selected to teach the principles of this invention is used as a basic computing block in a binary-to-binary coded-decimal converter and performs a plurality of logical "and then" operations in computing. An "and then" operation means that a certain pulse is first applied through windings to a saturable core "and then" the next pulse applied will perform a specific duty, such as saturate a following core for example. The first pulse sets the stage for the second pulse. In the present case the first pulse, a reset pulse, conditioning pulse, or "cocking" pulse as it is sometimes called, drives a core to one state of saturation (without producing an output pulse). The next pulse of opposite polarity or in an opposed winding drives the core to saturation in the opposite direction, energizing coils wrapped therearound. Thus, the core is conditioned to produce an output pulse in each selected output closed circuit with the next input pulse. The core then must be reset each time by an initial pulse before a second pulse will "fire" the core, i.e., change its flux state, causing an output pulse in a selected circuit.

Another examplary circuit is a diode controlled bistable magnetic core circuit used in a shift register adapted to shift from left to right. Another example is in a shift register in which the bias diode is common to a plurality of secondary circuits.

Still another circuit for illustrating the general application of the principles of the present invention is the "half-adder" circuit which performs the logical functions of "and" and "exclusive or." The "and" function requires that both pulses be present to activate the next core. The "exclusive or" requires that either of the pulses, but not both, be present to reset the core.

Heretofore a pulse from any of the input windings in these circuits served to condition the core so that when the reset pulse was applied, the information was sent out in all of the output windings. If a selected output was desired, the selection of the output circuit was done with more than one core and with complicated circuitry. Additional circuitry was needed to prevent a recurrence of pulses.

It is therefore an object of this invention to provide for an improved diode controlled bistable magnetic core circuit.

A further object is the provision of a magnetic core circuit wherein certain of the output circuits are closed and energized, as desired.

Another object is the provision of a magnetic core circuit wherein the core conditioning or reset pulse is received by the core before an information pulse is received in the activation of certain of the output circuits.

Another object is the provision of a magnetic core circuit wherein a pulse applied to windings on the core energizes all windings on the core and closes the paths of selected output circuits in which registration is desired.

Other objects and features of the present invention will be readily apparent to those skilled in the art from the following specification and appended drawing wherein is illustrated a preferred form of the invention, and in which.

Figure 2:
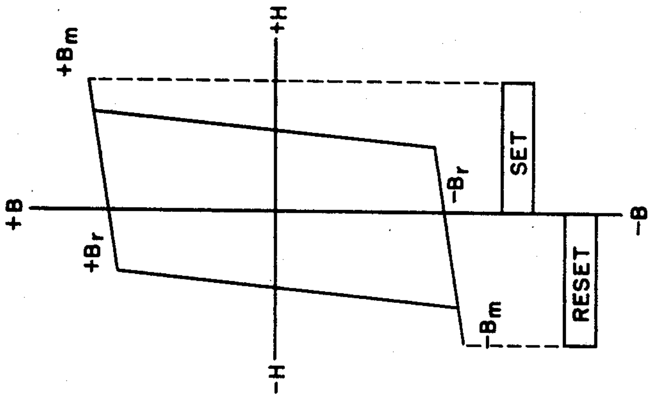
Figure 2 shows the hysteresis loop characteristics of the cores.
Figure 1:
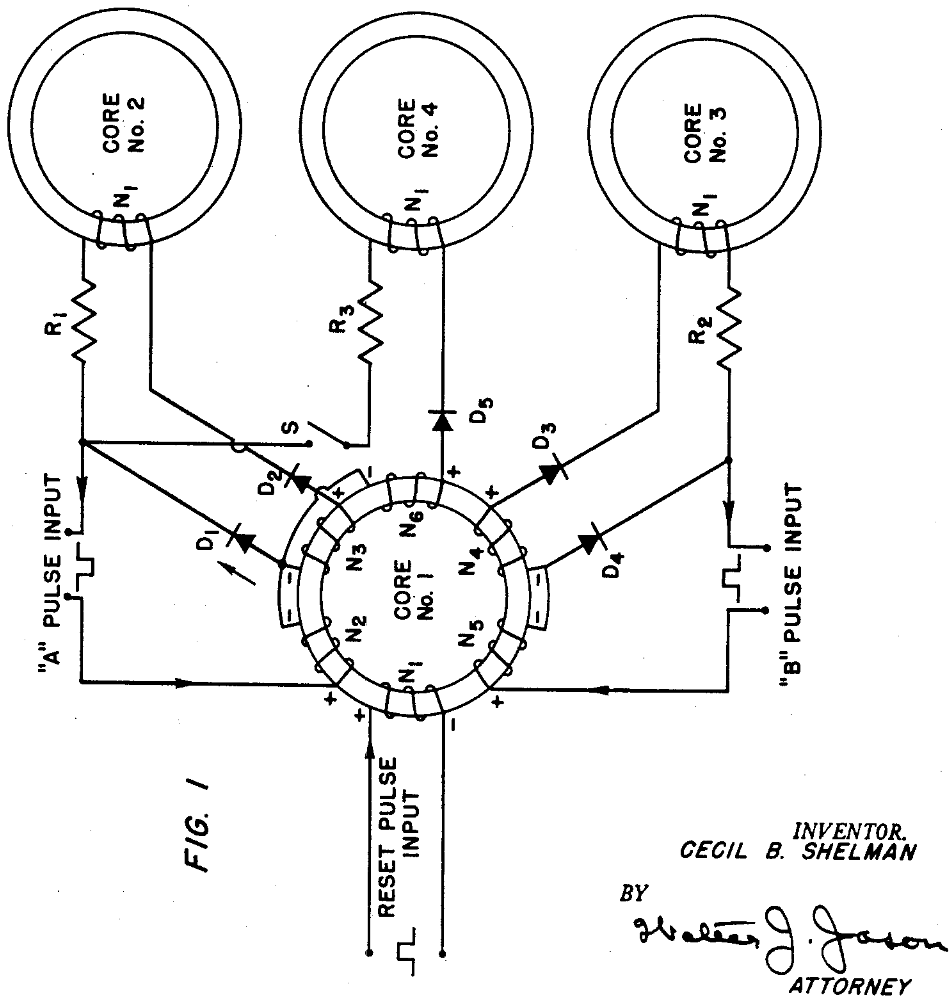
Figure 1 is a schematic of one circuit using the principles of the present invention.

Referring now to Figure 1 there is shown core 1 used as the basic computing block in a binary-to-binary-coded-decimal converter. Core 1 has the characteristics of the substantially rectangular hysteresis loop shown in Figure 2 and, because of its nearly vertical slope, operates in the positive and negative saturation regions. Desirable characteristics of the core material are a high saturation flux density $+B_m$, a high residual flux density $+B_r$, and a low coercive force H. An input conditioning or "cocking" pulse source is connected to winding $N_1$ on core 1 so that when the pulse is applied, the core is driven to a flux value of $-B_m$, and then back to $-B_r$ when the pulse is removed. This "cocks" the core by placing it in a condition so that a later pulse of opposite polarity, or pulse of same polarity through a winding wound in the opposite direction, will change the state of the core its maximum amount, i.e., from $-B_r$ to $+B_m$. This large change of flux in the core induces a voltage on all windings on the core with relative polarities as indicated in Figure 1.

The "A" pulse has a closed circuit through winding $N_2$, in the forward direction of diode $D_1$ as shown by the arrow and back to its source. A parallel path exists through winding $N_3$, diode $D_2$, winding $N_1$ of core 2, and resistance $R_1$. However, the impedance of this path is high compared with the resistance of diode $D_1$ so that the "A" pulse does not flow through this circuit to change the state of core 2. The voltage induced in winding $N_3$ is due to the large change in flux of the core caused by the pulse from the "A" pulse circuit. This change in flux causes current to flow in the winding $N_3$, through diode $D_2$, winding $N_1$ in core 2, and resistor $R_1$. This current is of sufficient magnitude to "cock" core 2, i.e., drive it to its $-B_r$ state, constituting a shifting of information from core 1 to core 2. When switch S is closed, the "A" pulse will also cause a current flow through coil $N_1$ of core 4.

Pulse "A" induces a voltage on winding $N_4$ also. This tends to cause current to flow through diode $D_3$, winding $N_1$ on core 3, resistor $R_2$ and diode $D_4$. However, because of the high back resistance of diode $D_4$, very little current will flow. Thus, the condition of core 3 is unchanged when there is a pulse from the "A" pulse circuit.

It should be noted that, after the input pulse has "cocked" core 1, i.e., driven it to its $-B_r$ state, the "A" pulse must occur before any other pulses in order to send a pulse to core 2 (and core 4 when switch S is closed). Suppose, for example, that the input pulse has driven the core 1 to its $-B_r$ state and then a "B" pulse appears before the "A" pulse. In this case current flows through coil $N_5$ on core 1, biases diode $D_4$ in its forward direction, and flows back to its source to complete its circuit. The voltage induced in coil $N_4$ by the current flow through coil $N_5$ is in the forward direction of diode $D_3$, through coil $N_1$ on core 3, and through resistor $R_2$. This, of course, drives core 3 to its $-B_r$ state, transmitting information from core 1. This same "B" pulse, however, cannot change the flux on core 2 or 4 because of the high back resistance of diode $D_1$.

Now, suppose after the "B" pulse the "A" pulse arrives at core 1. The core is already in its $+B_r$ state so that there is little or no change of flux. The pulse passes through diode $D_1$ in its forward direction but no voltage is induced into coil $N_3$ or $N_6$, hence no pulse is transmitted to coil $N_1$ of core 2 or 4. The cycle is started again by the input pulse which again drives the core from $+B_m$ to its $-B_r$ state. It should be noted that in so doing, the reverse mounted diodes prevent current flow through coils $N_1$ of cores 2, 3 and 4.

From the above description it becomes apparent that only the first pulse after the input pulse will cause an output pulse from core 1. The circuit path for this pulse is governed by its relation with the circuit having the first pulse therein, namely, the circuit having a reversed diode biased by the first pulse.

Figure 3:
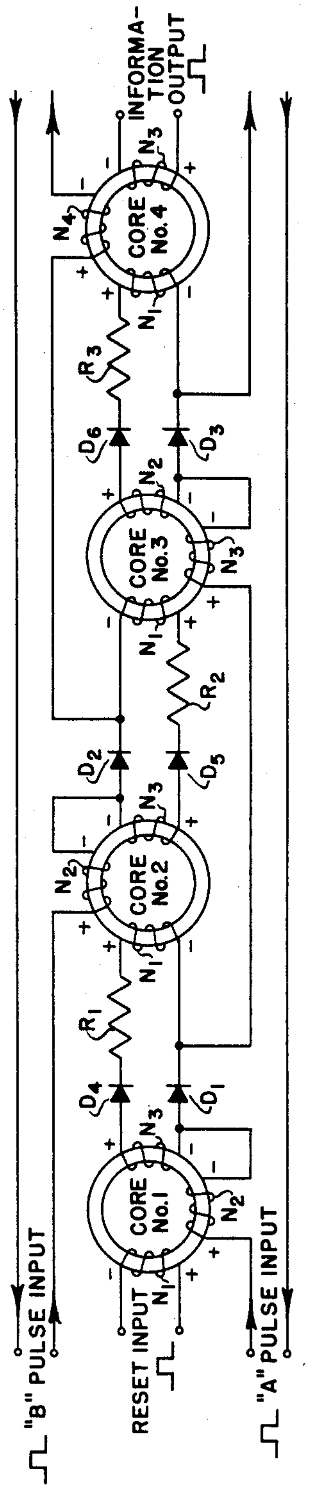
Figure 3 shows a left to right shift register circuit using the principles of the present invention.

In Figure 3 the diode controlled bistable magnetic core circuit is used in a shift register, which is adapted to shift successive "A" and "B" information pulses from left to right. To exemplify the operations of such a circuit, a hypothetical case is taken when a "one" is stored in core No. 2 or the magnetic flux is in the $-B_r$ state. When it is desired to remove this "one" from core No. 2 and store it in core No. 3, a "B" current pulse is applied to core No. 2 through winding $N_2$. This $N_2$ winding is wound in such direction as to cause the core to change magnetic state from $-B_r$ to $+B_m$. As core No. 2 changes state, a voltage is induced in all windings on the core. The voltage induced in winding $N_1$ tends to cause current to flow through the back resistance of diode $D_1$ in the circuit connecting core 1 with core 2. Inasmuch as this resistance is very high, current is prevented from flowing in this direction. The voltage induced in winding $N_3$ tends to cause current to flow through the forward resistance of diode $D_5$, resistor $R_2$, winding $N_1$ on core No. 3 and the back direction of diode $D_2$. In this case current is flowing through the forward direction of diode $D_2$ due to the "B" pulse. If the difference in currents results in a net current flow in the forward direction, core No. 3 may be reset by the secondary current through winding $N_1$. During this resetting period diode $D_6$ prevents current flow through winding $N_1$ of core No. 4 due to the voltage induced in winding $N_2$ of core No. 3 by the "B" pulse.

A parallel path exists across diode $D_2$ which consists in winding $N_3$ on core No. 2, diode $D_5$ in the forward direction, resistor $R_2$ and winding $N_1$ on core No. 3. The resistance of this parallel path must be high in comparison to the forward resistance of diode $D_2$ to prevent a portion of the "B" pulse current from resetting core No. 3 when a "zero" is being shifted to core No. 4.

Figure 4:
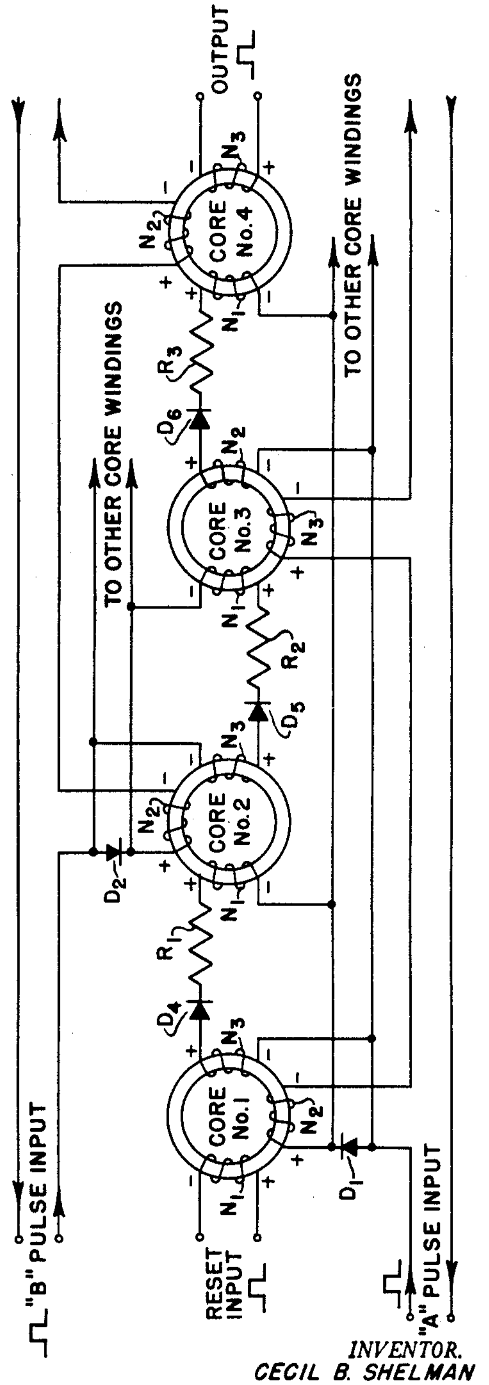
Figure 4 shows a shift register wherein the biased diode is common to a plurality of secondary circuits.

The shift register shown in Figure 4 shifts information responsive to successive "A" and "B" pulses from left to right and is another embodiment of the diode controlled magnetic core circuit. In this adaptation of the invention, the bias diodes $D_1$, $D_2$ in the "A" pulse and "B" pulse circuit paths are common to a relatively large plurality of secondary circuits. The primary "A" and "B" pulses are employed to bias the diodes in the forward direction. However, these diodes may be biased by separate pulses since such an arrangement may be desirable in some circuits. That there is no undesirable coupling between the secondary circuits may be shown in tracing out a secondary path. For purposes of illustration a case is considered where a voltage is developed across winding $N_3$ on core No. 1 in response to an "A" pulse input. A current path exists through the forward resistance of diode $D_4$, resistor $R_1$, winding $N_1$ of core No. 2, through the biased back resistance of diode $D_1$ and back to winding $N_3$ on core No. 1. A parallel path may exist through winding $N_1$ of core No. 4, resistor $R_3$ and the back resistance of diode $D_6$ making this a high resistance path as compared with the resistance of diode $D_1$. This register operates as efficiently as the register of Figure 3 with the elimination of a number of diodes.

Figure 5:
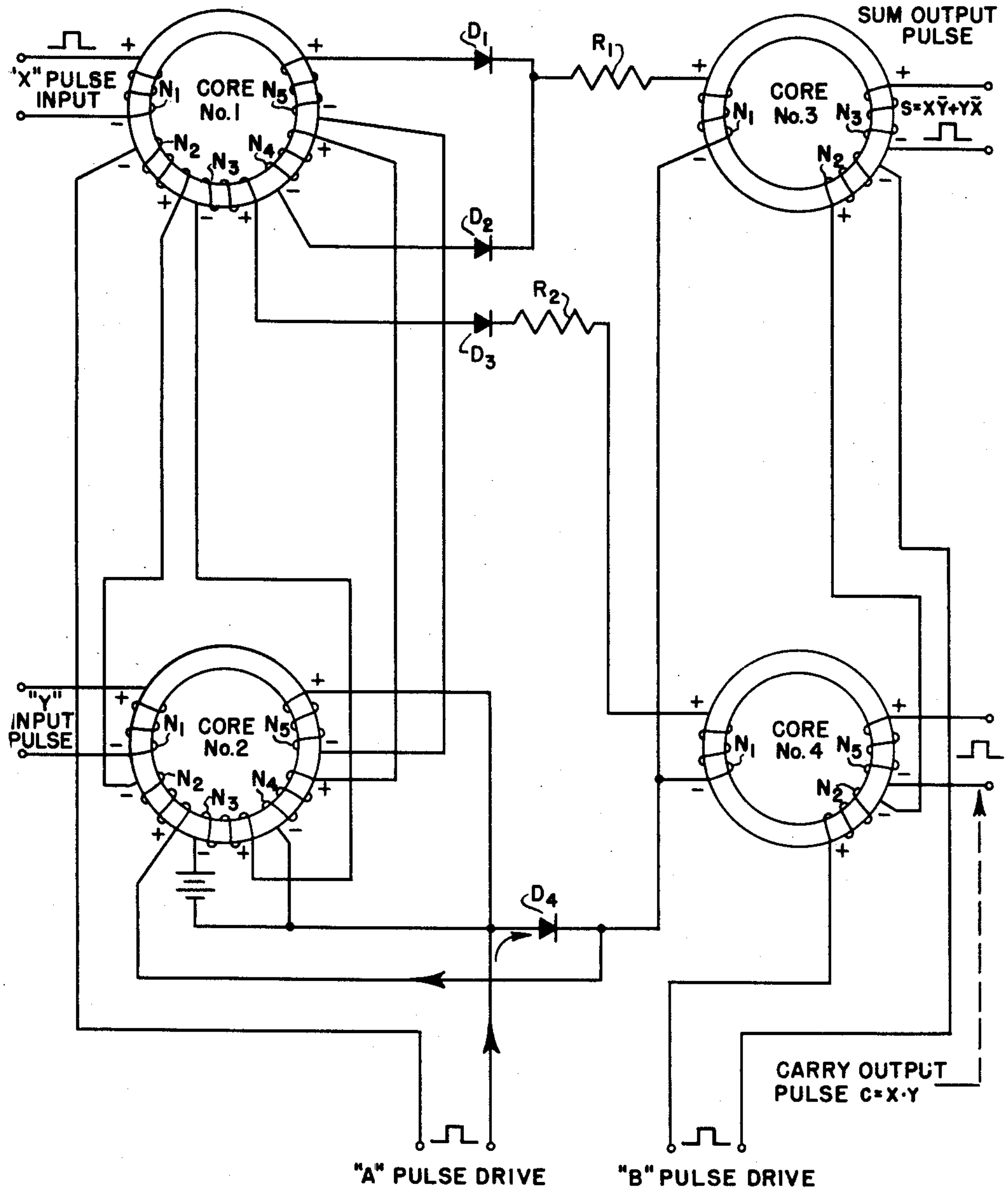
Figure 5 shows a half-adder circuit using the diode controlled bistable magnetic core.

The circuit of Figure 5 exemplifies a more complex circuit employing the basic diode controlled magnetic core circuit of the present invention. This is a "half-adder" circuit and performs the logical functions of "and" and "exclusive or." The "and" function requires that both "X" and "Y" be present before core No. 4 is reset. The "exclusive or" function requires that either "X" or "Y" but not both be present before core No. 3 is reset. Attention is now directed to the "and" circuit. The D.C. voltage and the output pulse from core No. 1 or core No. 2 are of the same magnitude, as for example, one unit of voltage. When both "X" and "Y" are present, one unit of voltage each is developed across windings $N_3$ of cores No. 1 and No. 2.

The "A" pulse passes through diode $D_4$ in its forward direction as it pulses $N_2$ of core No. 2 and $N_2$ on core No. 1 to drive them to the $+B_m$ state to induce the voltages across the $N_3$ windings. As these two windings are connected series aiding a total of two units of voltage are developed across these windings. The battery subtracts off one unit leaving a net of one unit to reset core No. 4 through it $N_1$ winding. Diode $D_4$ is biased by the "A" pulse in the forward direction at this time.

Since the $N_4$ and $N_5$ windings on core No. 1 are in series subtraction with the $N_4$ and $N_5$ windings on core No. 2, the voltages induced therein are canceled and core No. 3 is unaffected. If only one input, "X" or "Y" is present, either $N_3$ on core No. 1 or core No. 2 does not have a voltage across it and the voltage across the other is canceled by the D.C. battery voltage in the opposite direction. Thus, information is stored in core No. 4 only when both "X" and "Y" inputs are present when the "A" pulse is driven. Also, core No. 3 is not reset in the presence of both "X" and "Y" inputs.

Now, suppose only the "X" input is present. The "A" pulse induces no voltages across windings on core No. 2. In this case, as before stated, only the $N_3$ winding on core No. 1 has a voltage induced thereacross and its effect is canceled by the battery voltage in the opposite direction and core No. 4 is not reset. The voltage induced in $N_4$ of core No. 1 is in the wrong direction and tries to pass a current through the back resistance of diode $D_2$. Diode $D_2$ acts as an open circuit and no current flows. On the other hand the voltage across $N_5$ of core No. 1 passes current through the forward direction of $D_1$, through $R_1$ and $N_1$ of core No. 3 and resetting core 3.

If the "X" input is missing and the "Y" input is present, the voltage induced across $N_5$ of core No. 2 is in the wrong direction. It attempts to pass a current in the reverse direction through diode $D_1$, which is not forwardly biased and therefore acts as an open circuit. The voltage induced across the $N_4$ winding of core No. 2, however, is in the proper direction to pass through $D_2$, $R_1$ and $N_1$ of core No. 3. Thus core No. 3 is reset by the "A" pulse when either the "X" or the "Y" input is present but not both. Also, core No. 4 is not reset by one in the absence of the other.

After the "A" pulse has stored information in either core No. 3 or core No. 4, the "B" pulse will transfer the information to the next stage, as desired.

From the foregoing descriptions it is seen that the diode controlled magnetic core circuit is the only basic circuit needed to develop all known functions. The above described embodiments show various forms in which the basic circuit of the present invention prevents current coupling between various configurations of magnetic core circuits until such coupling is desired.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A magnetic circuit for performing logical functions comprising a plurality of magnetic cores having two magnetic states, said cores being of a material having a substantially rectangular hysteresis loop characteristic and capable of changing from one state to another in response to magnetizing forces, a control core for selectively transferring said magnetizing forces to said plurality of cores, an input winding positioned on said control core for producing a magnetizing force to establish it in one of said magnetic states, a plurality of output windings positioned on said control core and each respectively linking one of said plurality of cores, and second winding means linking said control core to an energy source for producing magnetizing forces to reset said control core in the other of said magnetic states to induce a current flow in said output windings, and said second winding means including means in said output windings controlling said current flow in selected ones of said output windings whereby a magnetizing force is transferred to the cores linked by said selected ones of said output windings.

2. A magnetic circuit for performing logical functions comprising a magnetic core of a material having a substantially rectangular hysteresis loop characteristic and having two magnetic states, a first winding linked with said core for establishing said core in one of said magnetic states in response to an input signal, a plurality of control windings linked with said core for establishing said core in another of said magnetic states in response to control pulses applied thereto, a plurality of output windings linked with said core and interconnected with windings linked to other magnetic cores, means in circuit with each of said control windings and an associated output winding for controlling current flow in said associated output winding in response to control pulses.

3. A magnetic circuit for performing logical functions as in claim 2, said means being a non-linear element of low resistance in the direction of current flow in said control winding and of high resistance in the direction of current flow in said associated output winding except when control pulses are applied to associated control winding.

4. A magnetic circuit for performing logical functions as in claim 2, said means comprising a non-linear resistance element offering low resistance to said control pulses applied to said control winding, said non-linear resistance element offering high resistance to current flow in said associated output winding in the absence of said control pulses.

5. A magnetic core circuit comprising a control core of a material having a substantially rectangular hysteresis loop characteristic, an input pulse winding thereon, an output circuit, an output pulse winding on said core connected to said output circuit, and means serially connected to said input pulse winding and in said output circuit, said means normally being of high impedance to current flow in one direction and of low impedance in the other direction, said input pulse winding being energized to permit current flow in said output circuit.

6. A magnetic core circuit comprising a core of a material having a substantially rectangular hysteresis loop characteristic having two magnetic states, an input pulse winding linked therewith, an output pulse winding also linked therewith, an output circuit, opposed non-linear resistance elements connecting said output circuit to said output pulse winding at each end thereof respectively, one of said elements being also connected to said input pulse winding to permit current in said input pulse winding to flow in its forward direction, means connected to said core for driving said core from one of said magnetic states to the other for producing a current flow in a closed electrical path in a direction through said output pulse winding, through the other of said elements in its forward direction, through said output circuit, and back to said output pulse winding, said other of said elements having a high back impedance to prevent current flow therethrough in the opposite direction.

7. A magnetic core circuit comprising a core of a material having a substantially rectangular hysteresis loop characteristic and having opposite states of substantial saturation, a first input winding for driving said core to one state of saturation, a plurality of output windings each having electrical paths connected thereto, relatively high impedances in said paths to oppose current flow in one direction therein induced by change in flux as said core is driven to said one state of saturation, a plurality of second input windings each for driving said core to the opposite state of saturation, relatively high impedances in said paths to oppose current flow therein in the opposite direction induced by change in flux as said core is driven by selected ones of said plurality of second input windings from said one state to said opposite state of saturation, said selected ones of said plurality of windings being connected to selected associated high impedances to permit current flow through selected paths associated therewith.

8. A magnetic core circuit comprising a core of a material having a substantially rectangular hysteresis loop characteristic and having two magnetic states, first coil means for applying a pulse to said core to change said core from one state to the opposite state, second coil means for applying a second pulse to said core to change its state from said opposite state to said one state, said second coil means having in its energization circuit a first diode with its forward position in the direction of current flow, an output circuit, output coil means around said core and connected to said output circuit, said output circuit including said first diode connected to one end of said output coil, a second diode connected to the other end of said output coil in a direction opposed to said first diode, and circuit impedances between said diodes, said output circuit providing a closed electrical path to current flow in one direction in said output coil, the back impedance of said second diode preventing current flow in said output circuit when said first coil means changes said core from said one state to said opposite state.

9. A magnetic core circuit comprising a core of a substantially rectangular hysteresis loop characteristic, an input winding connected thereto for driving said core in one direction, a diode connected to said winding and having its forward direction in the direction of current flow through said input winding to present a low impedance thereto, an output circuit having a coil on said core for inducing current therein in one direction responsive to change of flux in said core as said core is driven in said one direction, said diode being in said circuit and having its forward direction reversed to the direction of current flow in said circuit to present a high impedance thereto.

10. In a magnetic core circuit as in claim 9, and a second input winding connected to said core for driving said core in the opposite direction to induce a current in said output coil in the opposite direction to said one direction, and a second diode in said output connected in opposed relation to said first-mentioned diode to offer a high back impedance to current flow in said opposite direction and a low impedance to current flow in said one direction.

11. A magnetic core circuit, comprising a plurality of input windings, output circuits and diodes in the relationship set forth in claim 9, the first in time of said input windings to be energized simultaneously biases its associated diode in its forward direction and also induces a current in its associated output winding to thereby provide a current flow in its associated low impedance circuit, other input windings energized later in time failing to drive said core in a direction to thereby induce a current flow in their associated output circuits.

References Cited in the file of this patent

UNITED STATES PATENTS

| | | |
|---|---|---|
| 2,695,993 | Haynes | Nov. 30, 1954 |
| 2,825,820 | Sims | Mar. 4, 1958 |

OTHER REFERENCES

An article entitled: "Now-Diodes Amplify," published in "Radio-Electronics," November 1954, vol. XXV, No. 11, pp. 94–95.